Figure 1:
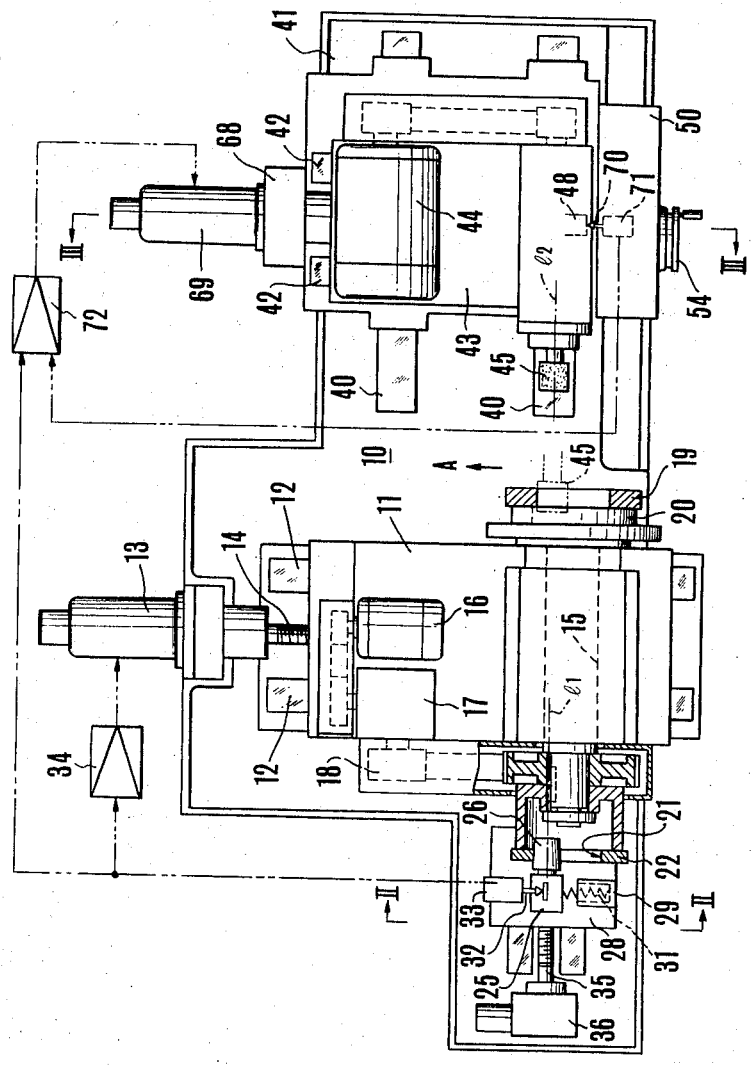

United States Patent [19]
Sakane et al.

[11] 3,834,084

[45] Sept. 10, 1974

[54] SERVO COPYING MACHINING APPARATUS

[75] Inventors: Kazuhiro Sakane, Kariya; Wataru Iida, Aichi-ken, both of Japan

[73] Assignee: Toyoda Koki Kabushiki Kaisha, Kariya-shi, Aichi-ken, Japan

[22] Filed: June 19, 1973

[21] Appl. No.: 371,523

[30] Foreign Application Priority Data
June 27, 1972   Japan................................ 47-64821

[52] U.S. Cl.................. 51/101 R, 82/1.3, 90/13.4, 318/578, 408/54
[51] Int. Cl........................... B24b 7/00, B24b 9/00
[58] Field of Search ................ 408/54; 82/19, 1.3; 90/13.4, 13.7; 51/100, 101 R, DIG. 32, 165, 165.79

[56] References Cited
UNITED STATES PATENTS

| | | | |
|---|---|---|---|
| 3,601,005 | 8/1971 | McKusick | 90/13.9 |
| 3,663,188 | 5/1972 | Hoglund | 51/101 R |
| 3,693,297 | 9/1972 | Cann | 51/101 R |
| 3,750,345 | 8/1973 | Kolesar | 51/101 R |

FOREIGN PATENTS OR APPLICATIONS
1,045,841   12/1958   Germany....................... 51/DIG. 32

*Primary Examiner*—Othell M. Simpson
*Attorney, Agent, or Firm*—Wenderoth, Lind & Ponack

[57] ABSTRACT

A servo copying machining apparatus comprises a main spindle rotatably journalled on a headstock capable of a copying motion. The spindle carries work mounting means and a template having a not truly circular curved surface. A stylus on the bed is urged against the curved surface and is associated with a displacement detector which detects the displacement of the stylus. A first servo motor responds to the detector output to initiate a copying motion of the headstock. A tool carriage carrying a tool is movable in a direction parallel to the direction of the movement of the headstock and is driven by a second servo motor. A second displacement detector senses the displacement of the tool carriage that results from a correcting copying motion of the tool carriage under the control of the second servo motor, which is controlled in accordance with the deviation between the outputs from the first and second displacement detectors.

5 Claims, 4 Drawing Figures

SERVO COPYING MACHINING APPARATUS

The invention relates to a servo copying machining apparatus which machines, by way of servo copying, a curved surface such as trochoidal surface which deviates from a truly circular surface.

A servo copying machining apparatus of this kind generally comprises a main spindle journalled on a headstock capable of being fed along by means of a servo motor, the main spindle having a work and a template of a not truly circular configuration desired for the work mounted thereon. The template is contacted by a stylus associated with a displacement detector which converts the amount of displacement of the stylus into an electrical signal, that is applied to the servo motor for initiating a copying motion of the headstock in a direction to eliminate the displacement of the stylus. A tool carriage is fed parallel to the direction of movement of the headstock by means of an in-fed drive unit so as to provide an in-feed of the tool into the work.

However, with such a system of the prior art, there must be a displacement of the stylus in order to initiate a copying motion of the headstock, and thus it follows that there always exists a substantial tracking lay between the displacement of the stylus and the following motion of the headstock to thereby cause an appreciable error in the configuration of the machined work with respect to the template. Such a disadvantage cannot be overcome by simply increasing the gain of the servo system, and in addition, a change in the setting of the gain, if attempted, induces numerous problems.

Therefore, the invention is directed to minimizing the tracking lay in the process of servo copying and thus improving the accuracy in the configuration achieved of the work, by arranging the tool carriage to be adjustably fed by a second servo motor in a direction parallel to the direction in which the headstock is fed, and providing a second displacement detector associated with the tool carriage for detecting any displacement thereof and for operating the second servo motor in accordance with any deviation between the output of the second displacement detector and the electrical output corresponding to the displacement of the stylus so as to cause a correcting copying motion of the tool carriage in accordance with that displacement of the stylus which is caused by the tracking lay in the copying motion of the headstock.

Another aspect of the invention is directed to a simple tool carriage feed mechanism which permits both the correcting copying feed and in-feed to be effected simultaneously, by providing a threaded shaft in threadable engagement with the tool carriage, the threaded shaft being adapted to be rotated by an in-feed drive unit and also axially translatable by means of the second servo motor, with the second displacement detector functioning to detect the axial translation of the threaded shaft.

Figure 4:
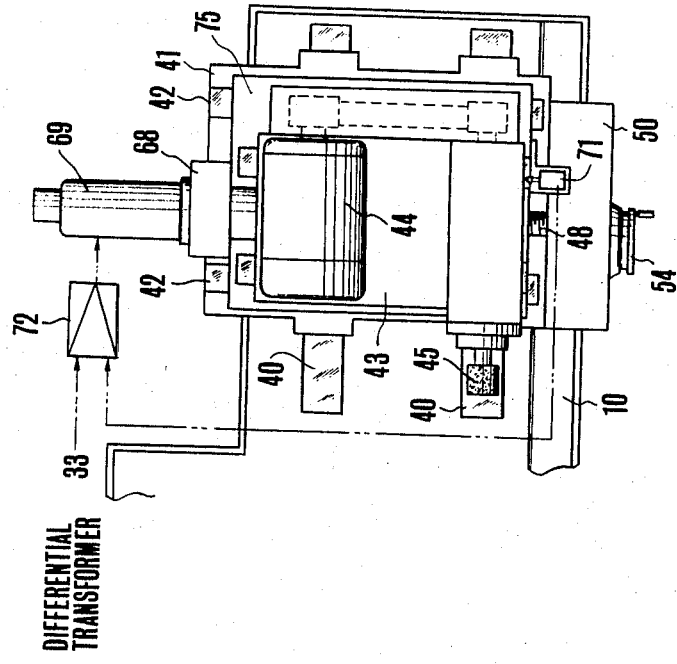
Figure 2:
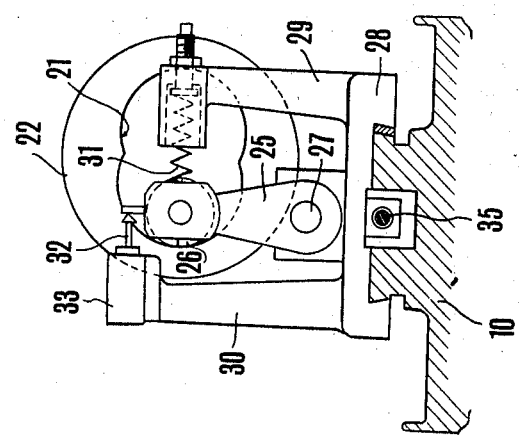
Figure 3:
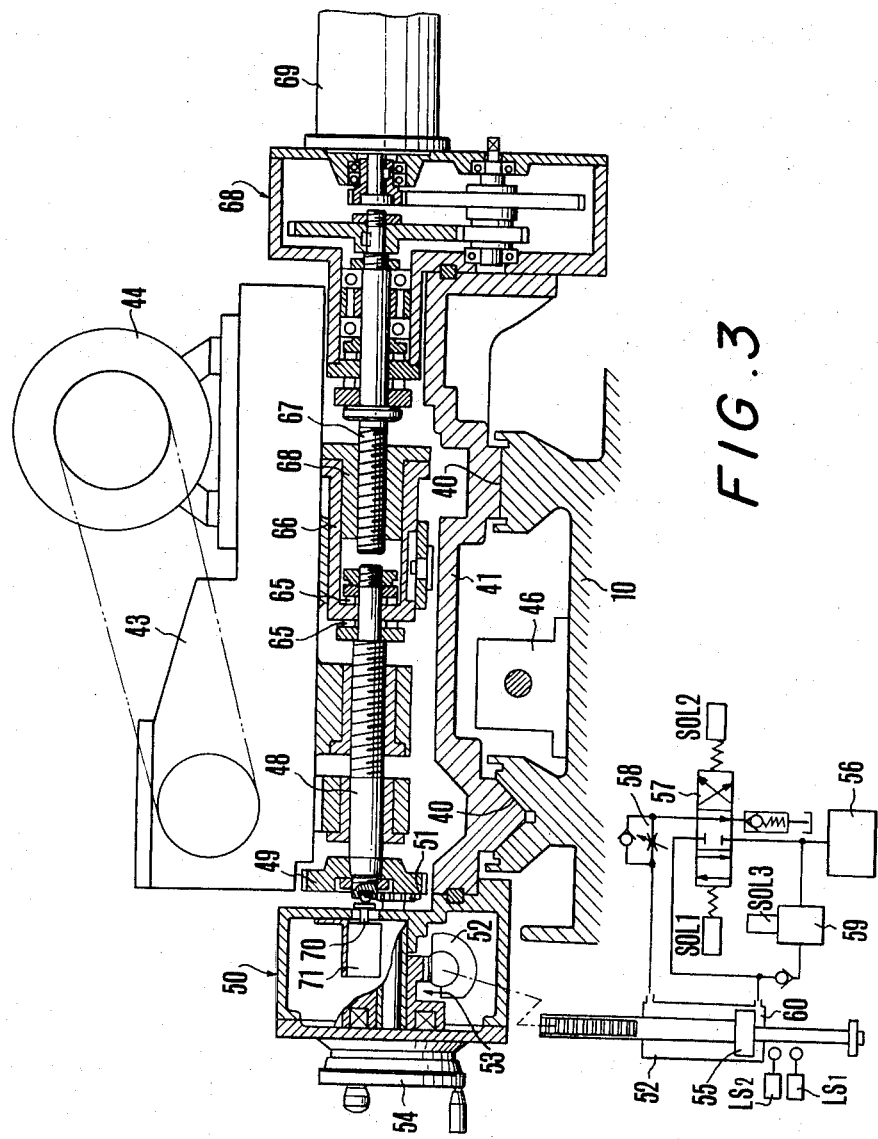

The above and other objects features and advantages of the invention will become apparent as the description proceeds with reference to the drawings, in which;

FIG. 1 is a plan view, partially in section of the servo copying machining apparatus according to the invention, FIG. 2 is an elevational view, partly in section, as seen from the line II — II of FIG. 1, FIG. 3 is an elevational view, partly in section, as seen from the line III— III of FIG. 1, and FIG. 4 is a plan view schematically illustrating part of another embodiment of the servo copying machining apparatus according to the invention.

Referring to FIG. 1, there is shown a bed 10 on which a headstock 11 is mounted slidably along longitudinally extending guide surface 12, 12 thereon. The headstock 11 is adapted to be driven by a first servo motor 13 through a threaded shaft 14 for longitudinal feed. A main spindle 15 is rotatably journalled on the headstock 11 and is adapted to be rotated by a motor 16 mounted on the headstock 11, the rotative power from which is transmitted to a worm and worm wheel mechanism 17 including an output pulley 18 that drives the main spindle. At one end, the main spindle 15 has a securely mounted thereon a holder 20 carrying a work 19, and a template 22 having a not truly circular bore 21 (see FIG. 2) desired for the work 19 is mounted on the other end of the main spindle 15 is concentric relationship with the work 19.

An arm 25 rotatably supports at its upper end a frusto-conical stylus 26 which contacts the bore 21 of the template 22 in a manner such that the stylus turns around as it follows the profile of the bore. At its lower end, the arm 25 is fixedly attached to a rocker shaft 27 at a position directly below the stylus 26 as shown, the rocker shaft 27 extending transversely. The rocker shaft 27 is rotatably mounted on an intermittent transfer table 28 that is guided transversely on the bed 10. The intermittent transfer table 28 is adapted to be fed intermittently through a threaded shaft 35 from an intermittent feed unit 36 when dressing a grinding wheel as will be described later so as to change the position of contact between the template 22 and the stylus 26 is a manner corresponding to a reduction in the diameter of the grinding wheel. A pair of stanchions 29, 30 are mounted on and extend vertically from the intermittent transfer table 28 on the opposite sides of the arm 25. One of the stanchions, 29, serves supporting a spring 31 which urges the arm 25 against the template 22 by its resilience, while the other stanchion 30 has mounted thereon a first differential transformer 33 which is associated with a movable finger 32 abutting against the arm 25 for detecting a rocking or oscillating displacement of the stylus 26.

The differential transformer 33 produces a voltage output proportional to the oscillating displacement of the stylus 26 and supplies it to an amplifier 34, the output voltage of which is applied to the first servo motor 13. Thus when the template 22 is driven for rotation together with the main spindle 15 by the motor 16, the stylus 26 tends to undergo an oscillating motion in following relationship with the not turly circular configuration of the bore 21. At this time, any displacement of the stylus 26 results in a corresponding voltage output from the differential transformer 33 being applied to the servo motor 13, with consequence that the headstock 11 is driven for a copying motion, which tends to reduce or eliminate the displacement of the stylus 26. Accordingly, the work 19 which is subject to a rotating motion corresponds to the not truly circular configuration referred to above.

A table 41 is guided along transversely extending guide surfaces 40, 40 on the bed 10, and a grinding wheel carriage 43 is guided along longitudinally extending guide surfaces 42, 42 on the table 41. The grinding wheel carriage 43 supports a grinding wheel 45 for rotation about an axis $l_2$ which is substantially aligned with the axis of rotation $l_1$ of the stylus 26, the grinding wheel 45 being driven for rotation by a motor 44. The table 41 is fed laterally by means of a table feed unit 46 (FIG. 3) so as to bring the grinding wheel 45 to a retracted position shown in solid line and a machining position shown in chain lines, alternatively.

As shown in FIG. 3, the grinding wheel carriage 43 threadably engages with an in-feed threaded shaft 48, to the one end of which is keyed with a driven gear 49. The driven gear 49 meshes with a drive gear 51 supported by an in-feed drive unit 50 which is constructed integrally with table 41. The drive gear 51 is rotated by an in-feed cylinder 52 through a rack-and-pinion mechanism 53, both of which are internally housed within the in-feed unit 50. The drive gear 51 is also adapted to be rotated by a turning operation of a handle 54. The in-feed cylinder 52 receives a piston 55 which is continuously driven forwardly (in the direction of in-feed) at a rate determined by a throttle valve 58 until it reaches a position in which it operates a limit switch $LS_1$ by the energization of the solenoid $SOL_1$ of a directional control valve 57 interposed in the path to a source of hydraulic pressure 56 subsequent to the arrival of the grinding wheel 45 at the machining position shown in chain lines. When the limit switch $LS_1$ is operated the solenoid $SOL_1$ is deenergized, and the solenoid $SOL_3$ of an intermittent supply valve 59 is alternately energized and deenergized for given intervals of time, whereby a very small amount of pressure oil is intermittently supplied to a back chamber 60 to provide an intermittent in-feed until foremost position is reached at which a limit switch $LS_2$ is operated, whereupon a solenoid $SOL_2$ is energized to cause retraction of the piston.

Thus, the grinding wheel carriage 43 is advanced in-feed in the direction of an arrow A shown in FIG. 1 as a result of continuous in-feed of the piston 55 which is transmitted through the in-feed threaded shaft 48, whereby the grinding wheel 45 initiates a rough grinding of the work 19. This is followed by a finish grinding of the work 19 which takes place by an intermittent in-feed of the grinding wheel 45 into the work 19 which is in turn effected by an intermittent in-feed of the piston 55.

The other end of the in-feed threaded shaft 48 is unified with a nut case 66 for axial movement by means of thrust bearings 65, 65. The nut case 66 is fitted while permitting an axial movement of the grinding wheel carriage 43, and has secured thereto a ball nut 68 which threadably engages with a correcting threaded shaft 67, which is in turn journalled on the table 41 rotatably, but no slidably and which is driven for rotation from a second servo motor 69 through a reduction gearing 68 securedly mounted on the table 41. The rotation of the correcting threaded shaft 67 causes both the nut case 66 and the in-feed threaded shaft 48 to axially translate, whereby a longitudinal feed of the grinding wheel carriage 43 on the table 41 can also be achieved by means of the second servo motor 69.

A second differential transformer 71 is mounted as the in-feed unit 50 and is associated with a movable finger 70 which abuts against one end face of the in-feed threaded shaft 48. The differential transformer 71 provides a voltage output proportional to the amount of axial displacement of the in-feed threaded shaft 48, which voltage output is applied to a servo amplifier 72 (FIG. 1). As mentioned previously, the servo amplifier also receives the voltage output of the first differential transformer 33 as its another input, and is arranged to produce a deviation output proportional to the difference between the voltage outputs from the two differential transformers 33 and 71 and to apply such deviation output to the second servo motor 69.

Thus with the system according to the invention, as the stylus 26 experiences a displacement as a result of the tracking lay in the copying motion of the headstock 11, the second servo motor 69 operates to rotate the correcting threaded shaft 67, which in turn causes an axial displacement of the nut case 66 and the in-feed threaded shaft 48. This produces a copying motion of the grinding wheel carriage 43 on the table 41 in accordance with the displacement of the stylus 26. Since the position of the grinding wheel carriage 43 during the copying motion thereof is detected by the second differential transformer 71 and the output from the latter drives the second servo motor 69 in a direction to reduce the deviation output from the servo amplifier 72 to zero, the grinding wheel carriage 43 is subjected to a correcting copying motion in a manner tracking the displacement of the stylus 26, with the result that the axis of rotation $l_2$ of the grinding wheel 45 is maintained substantially aligned with the axis of rotation $l_1$ of the stylus 26. In other words, the grinding wheel 43 grinds the work 19 in an exact manner as required by the configuration of the template 22. It should be noted that the correcting copying motion imparted to the grinding wheel carriage is controllable in parallel fashion with the in-feed imparted to the carriage 43 as a result of the rotation of the in-feed threaded shaft 48 caused by the in-feed drive unit 50.

FIG. 4 is a schematic plan view of the grinding wheel carriage feed mechanism according to another embodiment of the invention. In this figure, corresponding parts to those used in the first embodiment are denoted by like reference numerals. In this embodiment, an intermediate base 75 is longitudinally guided on the table 41 and is adapted to be driven for in-feed by means of the in-feed drive unit 50 through the in-feed threaded shaft 48. The grinding wheel carriage 43 is guided on the intermediate base 75 so as to be capable of a correcting copying motion longitudinally by means of the second servo motor 69. Thus, in this embodiment, the second differential transformer 71 is mounted on the intermediate base 75 so that it detects the displacement of the grinding wheel carriage 43.

From the foregoing description, it will be understood that in ccordance with the invention, the headstock 11 is subjected to a copying motion by the first servo motor 13 which is responsive to the output from the first displacement detector 33, and concurrently therewith, the tool carriage 43 is subjected by the second servo motor 69 which is responsive to the deviation between the outputs from the first and second displacement detectors 33 and 71, to a correcting copying motion which varies with that displacement of the stylus 26 as caused by the tracking lay of the headstock 11, thereby enabling the relative positions of the work 19 and the tool 45 to be controllably corrected in dependence upon the response lay in the servo copying of the headstock 11. As a consequence, the work 19 is machined precisely to the configurational accuracy of the template 22 without involving phase differential. In addition, the copying speed of the template 22 and the stylus 26 or the rotational speed of the main spindle 15 may be increased, since the configurational accuracy of the work 19 is not directly influenced by the response lay of the headstock 11, thereby permitting an improved work machining efficiency.

Furthermore, the in-feed threaded shaft 48 threadably engaging the tool carriage 43 undergoes an in-feed rotation under the control of the in-feed drive unit 50 and also undergoes an axial translation for the correcting copying motion under the control of the second servo motor 69, and this means that both the in-feed and the correcting copying motion of the tool carriage 43 take place in parallel fashion while maintaining the accuracy of the respective motions. THe use of the intermediate base 75 as shown in FIG. 4 is not essential to carrying out the invention, and hence a compact and rigid feed mechanism for the tool carriage 43 may be employed.

Having described the invention, what is claimed is:

1. A servo copying machining apparatus comprising a headstock guided on a base so as to be capable of a copying motion, a main spindle rotatably journalled on the headstock and including work mounting means and a template having a curved surface corresponding to a not truly circular curved surface which is to be machined in the work, a stylus on the base and adapted to contact the curved surface of the template in a tracking manner, a first displacement detector for produceing an output in accordance with the amount of displacement of the stylus, a first servo motor responsive to the output of the detector for subjecting the headstock to a copying motion, a tool carriage carrying a tool which machines the work and guided in a direction parallel to the direction of movement of the headstock, a second servo motor for subjecting the tool carriage to a correcting copying motion, a second displacement detector for detecting the amount of displacement of the tool carriage which results from the correcting copying motion, and means for generating a deviation output in response to the outputs from the first and second displacement detectors, said deviation output being applied to drive the second servo motor.

2. A servo copying machining apparatus according to claim 1, which further comprises an intermediate base slidably mounted on said base and carrying said tool carriage, and an in-feed drive unit for imparting an in-feed motion to said intermediate base, said second displacement detector being located on said intermediate base so as to be capable of detecting the correcting copying motion of said tool carriage independently of said in-feed motion provided by said in-feed drive unit.

3. A servo copying machining apparatus according to claim 1 further including an in-feed drive unit for imparting an in-feed motion to the tool carriage, said second displacement detector being located so as to be capable of detecting only the correcting copying motion of the tool carriage independently from the in-feed motion provided by the in-feed drive unit.

4. A servo copying machining apparatus according to claim 3, wherein said in-feed drive unit includes a threaded shaft threadably engaging with the tool carriage, said threaded shaft being only rotationally connected with the in-feed drive unit, the axial translation of the threaded shaft being governed by the second servo motor.

5. A servo copying machining apparatus according to claim 3, wherein said in-feed drive unit includes a first shaft threadably engaged with said tool carriage, and a nut case mounted on said tool carriage and only rotatably connected with said first shaft, said nut case being slidable in axial direction thereof, but being prevented from rotation thereof, and wherein said second servo motor includes a second shaft only rotatably mounted on said base and threadably engages with a nut which is fixedly mounted on said nut case.

* * * * *